(12) United States Patent
Kojima

(10) Patent No.: US 12,269,062 B2
(45) Date of Patent: Apr. 8, 2025

(54) ULTRASONIC DEVICE

(71) Applicant: SEIKO EPSON CORPORATION, Tokyo (JP)

(72) Inventor: Chikara Kojima, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 833 days.

(21) Appl. No.: 17/356,102

(22) Filed: Jun. 23, 2021

(65) Prior Publication Data

US 2021/0402435 A1 Dec. 30, 2021

(30) Foreign Application Priority Data

Jun. 30, 2020 (JP) ................................ 2020-112699

(51) Int. Cl.
*B06B 1/06* (2006.01)
*G01B 17/02* (2006.01)
*G01S 15/08* (2006.01)

(52) U.S. Cl.
CPC ............ *B06B 1/0603* (2013.01); *G01B 17/02* (2013.01); *G01S 15/08* (2013.01); *B06B 1/0607* (2013.01); *B06B 1/0629* (2013.01)

(58) Field of Classification Search
CPC .................................................. B06B 1/0603
See application file for complete search history.

(56) References Cited

U.S. PATENT DOCUMENTS

| 2008/0087090 | A1  | 4/2008  | Watanabe et al. |
| 2013/0294202 | A1* | 11/2013 | Hajati ................... B06B 1/0622 |
|              |     |         |                              310/366 |
| 2017/0252778 | A1* | 9/2017  | Kojima ................... H10N 30/20 |
| 2018/0182949 | A1* | 6/2018  | Kojima ................ H10N 30/302 |
| 2019/0129018 | A1* | 5/2019  | Osawa ..................... G01S 7/521 |
| 2019/0129019 | A1* | 5/2019  | Osawa .................. B06B 1/0622 |

FOREIGN PATENT DOCUMENTS

| JP | 2004298368 A | 10/2004 |
| JP | 2008099103 A |  4/2008 |
| JP | 2010154371 B |  8/2013 |
| JP | 2019080249 B |  9/2021 |

OTHER PUBLICATIONS

Office Action for JP Patent Application No. JP2020112699, issued on Jan. 23, 2023.

* cited by examiner

Primary Examiner — Bryan P Gordon
(74) Attorney, Agent, or Firm — CHIP LAW GROUP

(57) ABSTRACT

An ultrasonic device includes a substrate, a transmitter provided at the substrate and configured to transmit an ultrasonic wave to an object, and a receiver provided at a position different from the transmitter at the substrate and configured to receive an ultrasonic wave reflected by the object. A resonance frequency of the transmitter is higher than a resonance frequency of the receiver. An anti-resonance frequency of the receiver is included in a predetermined frequency band including the resonance frequency of the transmitter.

10 Claims, 8 Drawing Sheets

ULTRASONIC DEVICE

The present application is based on, and claims priority from JP Application Serial Number 2020-112699, filed Jun. 30, 2020, the disclosure of which is hereby incorporated by reference herein in its entirety.

BACKGROUND

1. Technical Field

The present disclosure relates to an ultrasonic device that transmits and receives an ultrasonic wave.

2. Related Art

There is an ultrasonic device including a plurality of ultrasonic elements disposed two-dimensionally in the related art. Further, in such an ultrasonic device, it is known that an intercepting slit that prevents propagation of vibration is provided between the ultrasonic elements in order to prevent a mechanical crosstalk between the ultrasonic elements.

For example, in an ultrasonic device described in JP-A-2008-99103, a groove-shaped intercepting slit is provided with respect to a resin member in which a plurality of ultrasonic elements are two-dimensionally disposed, and the intercepting slit prevents a mechanical crosstalk by partitioning the resin member into regions corresponding to respective ultrasonic elements.

Among the above-described ultrasonic devices, in an ultrasonic device for both transmission and reception in which an ultrasonic element for transmission (transmitter) and an ultrasonic element for reception (receiver) are two-dimensionally disposed, there is a problem that transmission and reception performance is deteriorated due to the mechanical crosstalk occurring between the transmitter and the receiver.

However, the intercepting slit disclosed in JP-A-2008-99103 described above has problems such as complicating a structure of the ultrasonic device and reducing a mechanical strength of the ultrasonic device, and thus it is not preferable to provide the intercepting slit in the ultrasonic device for both transmission and reception.

SUMMARY

An ultrasonic device according to an aspect of the present disclosure includes a substrate, a transmitter provided at the substrate and configured to transmit an ultrasonic wave to an object, and a receiver provided at a position different from the transmitter at the substrate and configured to receive an ultrasonic wave reflected by the object. A resonance frequency of the transmitter is higher than a resonance frequency of the receiver. An anti-resonance frequency of the receiver is included in a frequency band corresponding to the resonance frequency of the transmitter.

DESCRIPTION OF EXEMPLARY EMBODIMENTS

Hereinafter, an embodiment of the present disclosure will be described.

Figure 1:
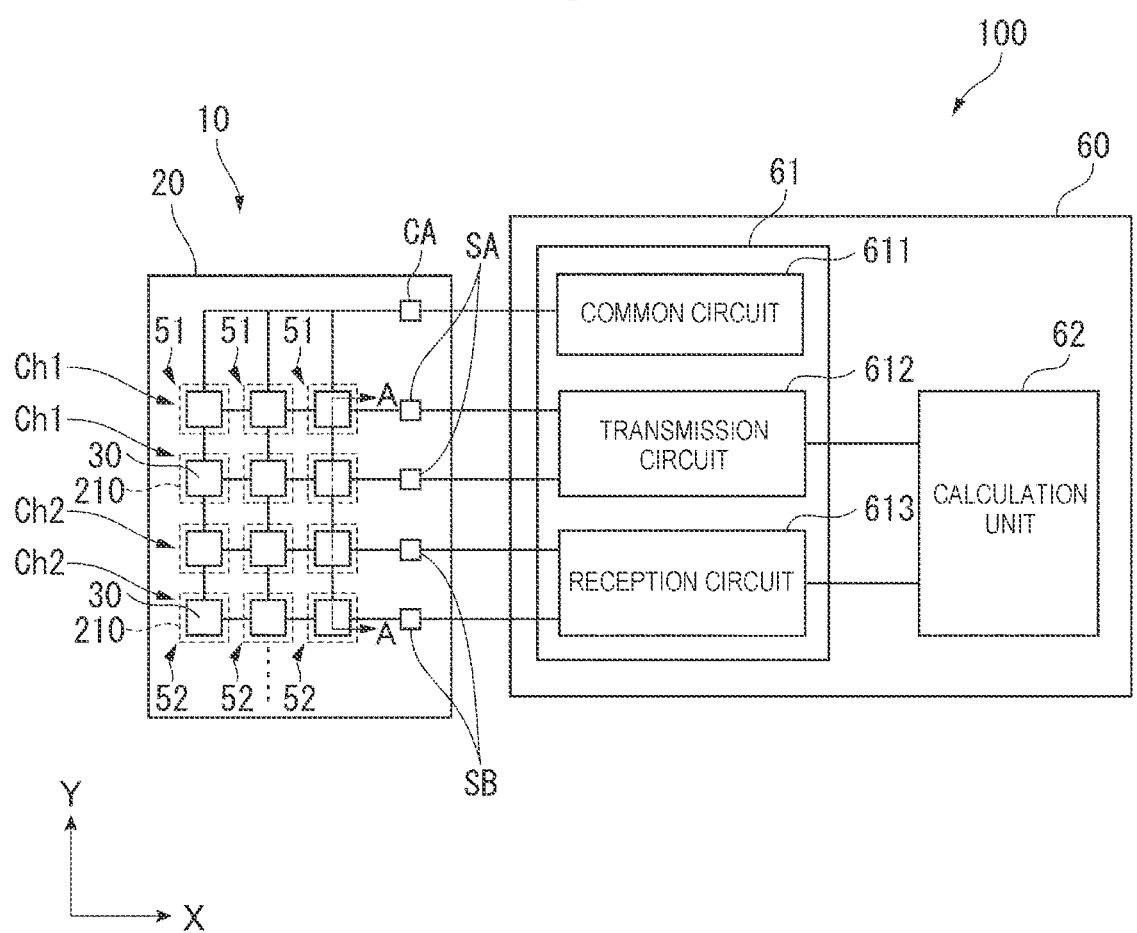
FIG. 1 is a block diagram showing a schematic configuration of an ultrasonic apparatus according to an embodiment of the present disclosure.

FIG. 1 is a diagram showing a schematic configuration of an ultrasonic apparatus 100 according to the present embodiment.

As shown in FIG. 1, the ultrasonic apparatus 100 includes an ultrasonic device 10 and a control unit 60.

Such an ultrasonic apparatus 100 can be used as a distance sensor or a thickness detection sensor by transmitting an ultrasonic wave from the ultrasonic device 10 to an object (not shown) and receiving an ultrasonic wave reflected by the object.

For example, when the ultrasonic apparatus 100 is used as a distance sensor, the control unit 60 measures a time from a transmission timing of the ultrasonic wave from the ultrasonic device 10 to a reception timing at which the ultrasonic device 10 receives the ultrasonic wave reflected by the object. Accordingly, the control unit 60 calculates a distance from the ultrasonic device 10 to the object based on the measured time and a known sound velocity.

Further, when the ultrasonic apparatus 100 is used as a thickness detection sensor, the control unit 60 transmits the ultrasonic wave from the ultrasonic device 10 to the object, and measures a sound pressure of the ultrasonic wave reflected by the object and received by the ultrasonic device 10. Accordingly, the control unit 60 can detect a thickness of the object and an overlap of objects based on the sound pressure.

Hereinafter, each configuration of the ultrasonic apparatus 100 will be described.

Configuration of Ultrasonic Device 10

Figure 2:
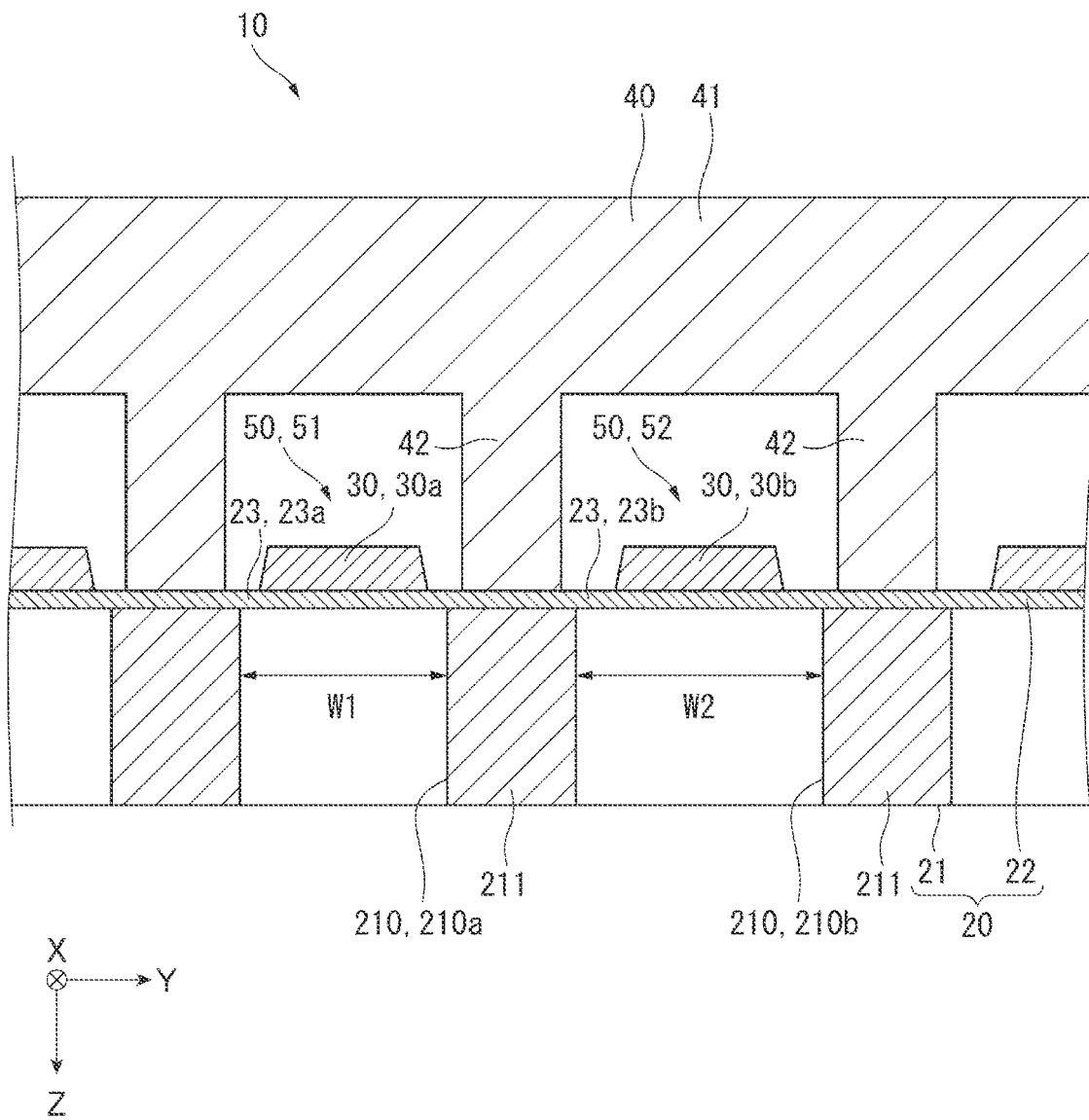
FIG. 2 is a cross-sectional view schematically showing ultrasonic elements taken along a line A-A in FIG. 1.

FIG. 2 is a cross-sectional view of the ultrasonic device 10 taken along a line A-A in FIG. 1. A configuration of the ultrasonic device 10 will be described mainly with reference to FIG. 2.

As shown in FIG. 2, the ultrasonic device 10 includes a substrate 20, piezoelectric elements 30 disposed on the substrate 20, and a protective member 40 covering the piezoelectric elements 30.

Here, a thickness direction of the substrate 20 is defined as a Z direction. A direction orthogonal to the Z direction is defined as an X direction, and a direction orthogonal to the X direction and the Z direction is defined as a Y direction.

The substrate 20 includes a substrate main body 21 and a vibration plate 22 provided at one surface side of the substrate main body 21.

The substrate main body 21 is a member that support the vibration plate 22, and is formed of a semiconductor substrate such as Si.

The substrate main body 21 is provided with a plurality of openings 210 penetrating the substrate main body 21 along the Z direction. The plurality of openings 210 are disposed in a two-dimensional array shape along the X direction and the Y direction with respect to the substrate main body 21 (see FIG. 1). Thus, in the substrate main body 21, a wall portion 211 is provided between the openings 210 adjacent to each other in the X direction and the Y direction.

An opening width of each of the openings 210 is each dimension in the X direction and the Y direction, and is equal to each other. Details of the opening width will be described later.

The vibration plate 22 is formed of, for example, a laminate of $SiO_2$ and $ZrO_2$. The vibration plate 22 is supported by the substrate main body 21 and closes one side of each of the openings 210 in the Z direction (−Z direction side).

Regions of the vibration plate 22 overlapping the openings 210 when viewed from the Z direction, that is, regions surrounded by edges of the wall portions 211 of the substrate 20 constitute vibrating portions 23. Dimensions of each of the vibrating portions 23 in the X direction and the Y direction correspond to the dimensions of each of the opening width of the opening 210 in the X direction and the Y direction, respectively.

Further, similarly to the plurality of openings 210, the plurality of vibrating portions 23 are disposed in a two-dimensional array shape in which the vibrating portions 23 are disposed along the X direction and the Y direction.

A piezoelectric element 30 is provided for each of the vibrating portions 23 of the vibration plate 22. The piezoelectric element 30 is a vibrating element that vibrates the vibrating portion 23. Although a detailed configuration of the piezoelectric element 30 is not shown, the piezoelectric element 30 is configured by sequentially stacking a lower electrode, a piezoelectric film, and an upper electrode on a surface on the −Z direction side of the vibrating portion 23.

Each of the lower electrode and the upper electrode constituting the piezoelectric element 30 is electrically coupled to the control unit 60 via a signal line (see FIG. 1).

The protective member 40 includes a substrate-shaped base portion 41 disposed to face the vibration plate 22, and protruding portions 42 each having a shape protruding from the base portion 41 toward the vibration plate 22. A protruding distal end of the protruding portion 42 is joined to a region of the vibration plate 22 that overlaps the wall portion 211 of the substrate main body 21 when viewed from the Z direction. The piezoelectric element 30 is disposed in a space surrounded by the protruding portions 42 in the protective member 40. In FIG. 1, the protective member 40 is not shown.

In the ultrasonic device 10 described above, each ultrasonic element 50 is configured with one vibrating portion 23 and the piezoelectric element 30 disposed on the vibrating portion 23. The ultrasonic element 50 of the present embodiment is a bending vibration type ultrasonic transducer.

The ultrasonic elements 50 are divided into transmitters 51 and receivers 52, which will be described later.

Hereinafter, the opening 210, the vibrating portion 23, and the piezoelectric element 30 corresponding to each transmitter 51 are referred to as an opening 210a (transmission opening), a vibrating portion 23a (transmission vibrating portion), and a piezoelectric element 30a (transmission piezoelectric element), respectively.

Similarly, the opening 210, the vibrating portion 23, and the piezoelectric element 30 corresponding to each receiver 52 are referred to as an opening 210b (reception opening), a vibrating portion 23b (reception vibrating portion), and a piezoelectric element 30b (reception piezoelectric element), respectively.

Transmission and Reception of Ultrasonic Wave

As shown in FIG. 1, the ultrasonic device 10 of the present embodiment is provided with one or more transmission channels Ch1 for transmitting the ultrasonic wave and one or more reception channels Ch2 for receiving the ultrasonic wave.

Each of the transmission channel Ch1 and the reception channel Ch2 includes a plurality of ultrasonic elements 50. The ultrasonic elements 50 included in the transmission channel Ch1 are the transmitters 51, and the ultrasonic elements 50 included in the reception channel Ch2 are the receivers 52.

In FIG. 1, for simplification of the figure, the number of the transmission channels Ch1 and the reception channels Ch2, the number of the ultrasonic elements 50 included in each channel, and the like are omitted, but the ultrasonic device 10 may include more channels and ultrasonic elements 50.

Further, an arrangement of each of the transmission channel Ch1 and the reception channel Ch2 and an arrangement of the ultrasonic element 50 included in each channel are not limited to an arrangement shown in FIG. 1. For example, a plurality of reception channels Ch2 may be disposed around each transmission channel Ch1. The ultrasonic elements 50 included in each channel may be disposed in a two-dimensional array instead of a linear shape.

In each of the transmitters 51 included in the transmission channel Ch1, the upper electrode and the lower electrode are coupled to signal lines, respectively.

Specifically, the upper electrode of each transmitter 51 is coupled to a common signal line, and the common signal line is coupled to a common terminal CA provided at an outer peripheral portion of the substrate 20.

Further, the lower electrode of each transmitter 51 is coupled to a transmission signal line for each transmission channel Ch1, and the transmission signal line is coupled to a signal terminal SA for each transmission channel Ch1 provided at the outer peripheral portion of the substrate 20. That is, the lower electrode of the transmitter 51 included in the transmission channel Ch1 is coupled in series to the signal terminal SA for each transmission channel Ch1.

According to such a configuration, by inputting a bias signal to the common terminal CA and inputting a drive signal to the signal terminals SA, it is possible to drive the transmitters 51 of the transmission channels Ch1 corresponding to the signal terminals SA. At this time, in the piezoelectric element 30a of each transmitter 51, a voltage is applied between the lower electrode and the upper electrode, such that the piezoelectric film expands and contracts, and the vibrating portion 23a vibrates at an oscillation frequency corresponding to the opening width and the like of the opening 210a. Accordingly, the ultrasonic wave is transmitted from the transmission channels Ch1 toward the other side in the Z direction.

In each of the receivers 52 included in the reception channels Ch2, the upper electrode and the lower electrode are coupled to signal lines, respectively.

Specifically, the upper electrode of each receiver 52 is coupled to the common signal line, and the common signal line is coupled to the common terminal CA provided at the outer peripheral portion of the substrate 20.

Further, the lower electrode of each receiver 52 is coupled to a reception signal line for each reception channel Ch2, and the reception signal line is coupled to a signal terminal SB for each reception channel Ch2 provided at the outer peripheral portion of the substrate 20. That is, the lower electrode of the receiver 52 included in the reception channel Ch2 is coupled in series to the signal terminal SB for each reception channel Ch2.

According to such a configuration, when the reception channels Ch2 receive the ultrasonic wave, in each receiver 52 of the reception channels Ch2, the vibrating portion 23b vibrates, and a potential difference is generated between the lower electrode side and the upper electrode side of the piezoelectric film in the piezoelectric element 30b. Accordingly, a reception signal having a signal voltage corresponding to the potential difference is output from the reception channels Ch2, and the control unit 60 can detect the reception of ultrasonic wave.

Configuration of Control Unit 60

As shown in FIG. 1, the control unit 60 includes a drive circuit 61 that drives the ultrasonic device 10, and a calculation unit 62 that controls an overall operation of the ultrasonic apparatus 100. Further, the control unit 60 may include a storage unit that stores various data, various programs, and the like for controlling the ultrasonic apparatus 100.

The drive circuit 61 is a driver circuit for controlling the driving of the ultrasonic device 10, and includes a common circuit 611, a transmission circuit 612, and a reception circuit 613.

The common circuit 611 is coupled to the common terminal CA, and applies a reference potential (for example, 0V) to the upper electrode of the ultrasonic element 50.

The transmission circuit 612 is coupled to the signal terminals SA and the calculation unit 62, outputs a drive signal having a pulse waveform to each transmitter 51 of the transmission channels Ch1 based on the control of the calculation unit 62, and causes each transmitter 51 to transmit the ultrasonic wave.

The reception circuit 613 is coupled to the signal terminal SB and the calculation unit 62, and performs signal processing on the reception signal input from the reception channels Ch2. For example, the reception circuit 613 includes a linear noise amplifier, an A/D converter, and the like, performs the signal processing such as conversion of the input reception signal into a digital signal, removal of a noise component, amplification to a desired signal level, and the like, and then outputs the processed reception signal to the calculation unit 62.

The calculation unit 62 includes, for example, a microcomputer and the like, and controls the ultrasonic device 10 via the drive circuit 61 to perform transmission and reception processing of ultrasonic wave by the ultrasonic device 10.

Further, the calculation unit 62 performs various processing based on the reception signal input from the reception circuit 613 of the drive circuit 61. For example, when the ultrasonic apparatus 100 is used as a distance sensor, the calculation unit 62 calculates the distance from the ultrasonic device 10 to the object based on the time from the transmission timing of the ultrasonic wave to the reception timing of the reception signal.

Frequency Characteristics of Ultrasonic Element 50

Frequency characteristics of the ultrasonic element 50 common to the transmitter 51 and the receiver 52 will be described.

Figure 3:
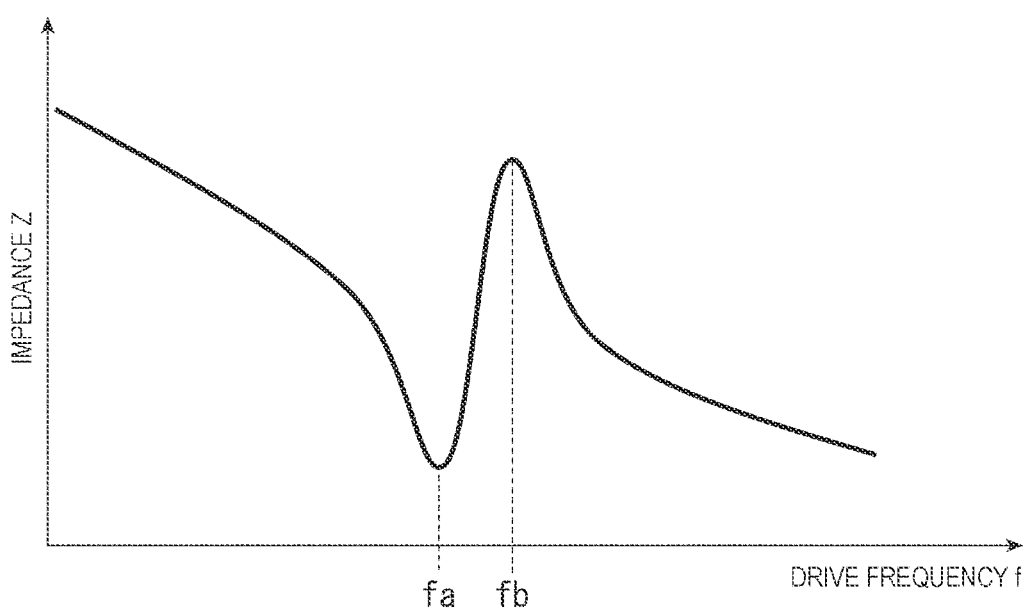
FIG. 3 is a diagram showing an impedance curve of the ultrasonic element of the present embodiment.

FIG. 3 is a graph showing an impedance curve of the ultrasonic element 50. In the graph, a vertical axis represents an impedance Z of the ultrasonic element 50, and a horizontal axis represents a drive frequency f.

As shown in FIG. 3, the ultrasonic element 50 has a specific impedance characteristic in which the impedance Z changes with respect to a change in the drive frequency f.

Specifically, the impedance characteristic of the ultrasonic element 50 has a frequency at which the impedance Z is minimized (resonance frequency fa) and a frequency at which the impedance Z is maximized (anti-resonance frequency fb). Here, resonance frequency fa<anti-resonance frequency fb.

At the resonance frequency fa, a current flowing through the ultrasonic element 50 increases due to the minimum impedance Z, and at the anti-resonance frequency fb, the current flowing through the ultrasonic element 50 decreases due to the maximum impedance Z.

In the ultrasonic element 50, the anti-resonance frequency fb is expressed by the following equation (1).

$$fb = fa \times \sqrt{\left(1 + k^2 \times \left(\frac{Cb}{Ca}\right)\right)} \quad (1)$$

In the above-described equation (1), k is a coupling constant, Ca is a braking capacitance, and Cb is an electrostatic capacitance at a time of resonance.

Figure 4:
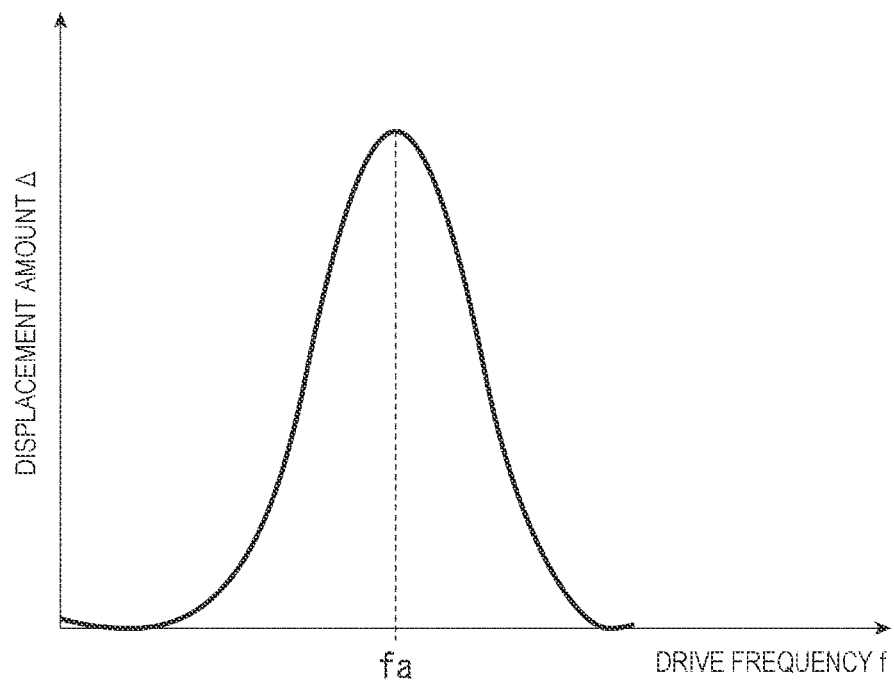
FIG. 4 is a diagram showing a resonance curve of the ultrasonic element of the present embodiment.

FIG. 4 is a graph showing a resonance curve of the ultrasonic element 50. In the graph, a vertical axis represents a displacement amount Δ of the ultrasonic element 50, and a horizontal axis represents the drive frequency f. The displacement amount Δ of the ultrasonic element 50 is a deformation amount in a thickness direction of the vibrating portion 23, and can be obtained, for example, by performing measurement using a laser Doppler vibrometer at a time of vibration of the ultrasonic element 50.

As shown in FIG. 4, the displacement amount Δ of the ultrasonic element 50 has a peak at the resonance frequency fa.

As described above, in the ultrasonic element 50 of the present embodiment, the drive frequency f at which transmission efficiency is the best is the resonance frequency fa, and the drive frequency f at which reception sensitivity is the best is the anti-resonance frequency fb. Such frequency characteristics of the ultrasonic element 50 are common to the transmitter 51 and the receiver 52.

Hereinafter, the resonance frequency fa of the transmitter 51 is referred to as a resonance frequency fa1, the anti-resonance frequency fb of the transmitter 51 is referred to as an anti-resonance frequency fb1, the resonance frequency fa of the receiver 52 is referred to as a resonance frequency fa2, and the anti-resonance frequency fb of the receiver 52 is referred to as an anti-resonance frequency fb2.

Frequency Characteristics of Transmitter 51 and Receiver 52

In the present embodiment, since one vibration plate 22 is shared between the transmitter 51 and the receiver 52, and the piezoelectric elements 30a and 30b have a common configuration between the transmitter 51 and the receiver 52, the resonance frequency of each of the transmitter 51 and the receiver 52 is adjusted by the opening width of each of the openings 210a and 210b corresponding to the transmitter 51 and the receiver 52.

Hereinafter, a relationship between a frequency characteristic of the transmitter 51 and a frequency characteristic of the receiver 52 will be described using a comparative example.

Figure 5:
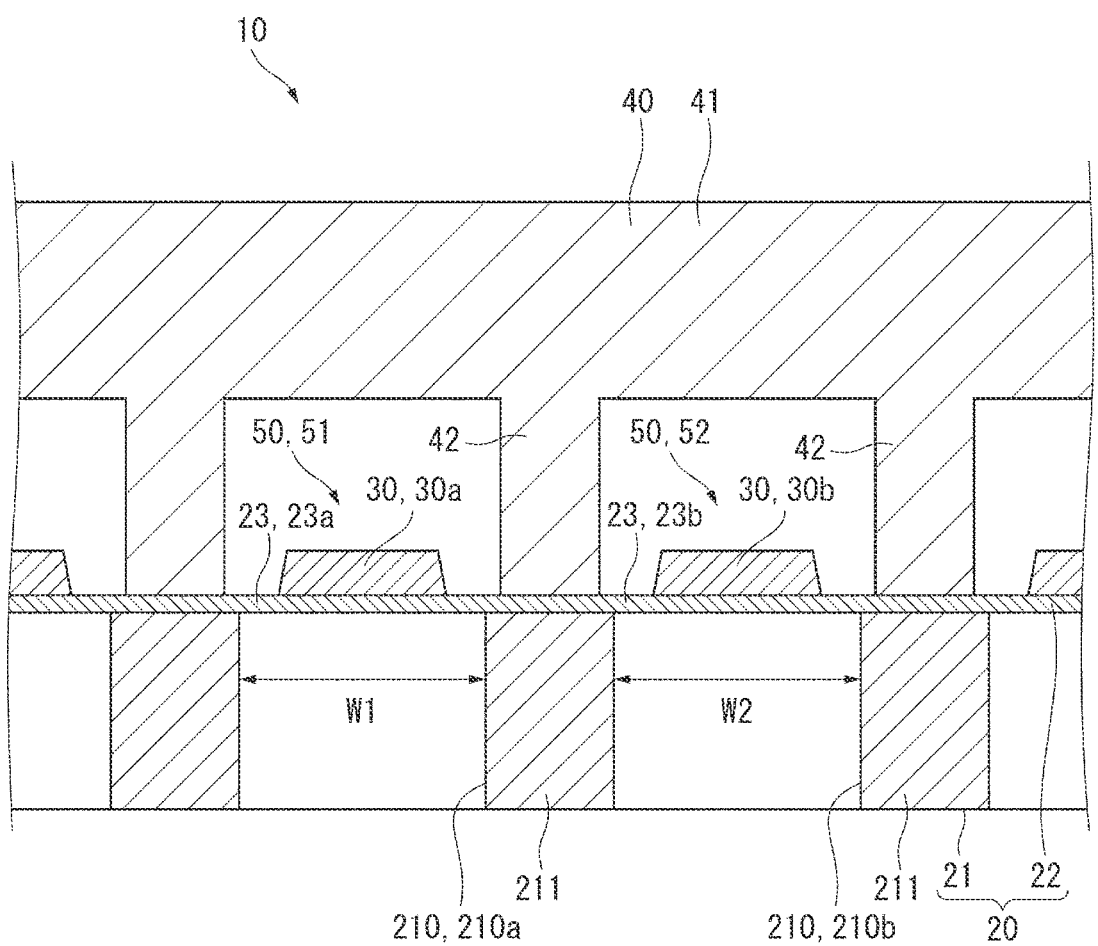
FIG. 5 is a cross-sectional view schematically showing ultrasonic elements according to a comparative example of the present embodiment.

FIG. 5 is a diagram showing the ultrasonic device 10 as the comparative example of the present embodiment. In the comparative example of FIG. 5, components corresponding to those of the present embodiment are denoted by the same reference numerals as those of the present embodiment.

In the comparative example, as shown in FIG. 5, since an opening width W1 of the opening 210a of the transmitter 51 is equal to an opening width W2 of the opening 210b of the receiver 52 (W1=W2), the resonance frequency fa1 of the transmitter 51 and the resonance frequency fa2 of the receiver 52 are equal to each other (fa1=fa2), and the transmitter 51 and the receiver 52 can efficiently vibrate at the same frequency.

In such a comparative example, when the transmitter 51 vibrates at the resonance frequency fa1, the receiver 52 easily vibrates due to the vibration propagated from the transmitter 51. That is, a performance of the receiver 52 decreases due to the mechanical crosstalk from the transmitter 51 to the receiver 52.

On the other hand, in the present embodiment, as shown in FIG. 2, since the opening width W1 of the opening 210a of the transmitter 51 is smaller than the opening width W2 of the opening 210b of the receiver 52 (W1<W2), the resonance frequency fa1 of the transmitter 51 is larger than the resonance frequency fa2 of the receiver 52 (fa1>fa2), and the transmitter 51 and the receiver 52 can efficiently vibrate at different frequencies.

In such an embodiment, when the transmitter 51 vibrates at the resonance frequency fa1, the receiver 52 is unlikely to vibrate due to the vibration propagated from the transmitter 51. Therefore, the mechanical crosstalk from the transmitter 51 to the receiver 52 can be reduced.

In the present embodiment, a difference between the opening width W1 of the transmitter 51 and the opening width W2 of the receiver 52, that is, a difference between the resonance frequency fa1 of the transmitter 51 and the resonance frequency fa2 of the receiver 52 is adjusted so as to satisfy conditions to be described below.

Figure 6:
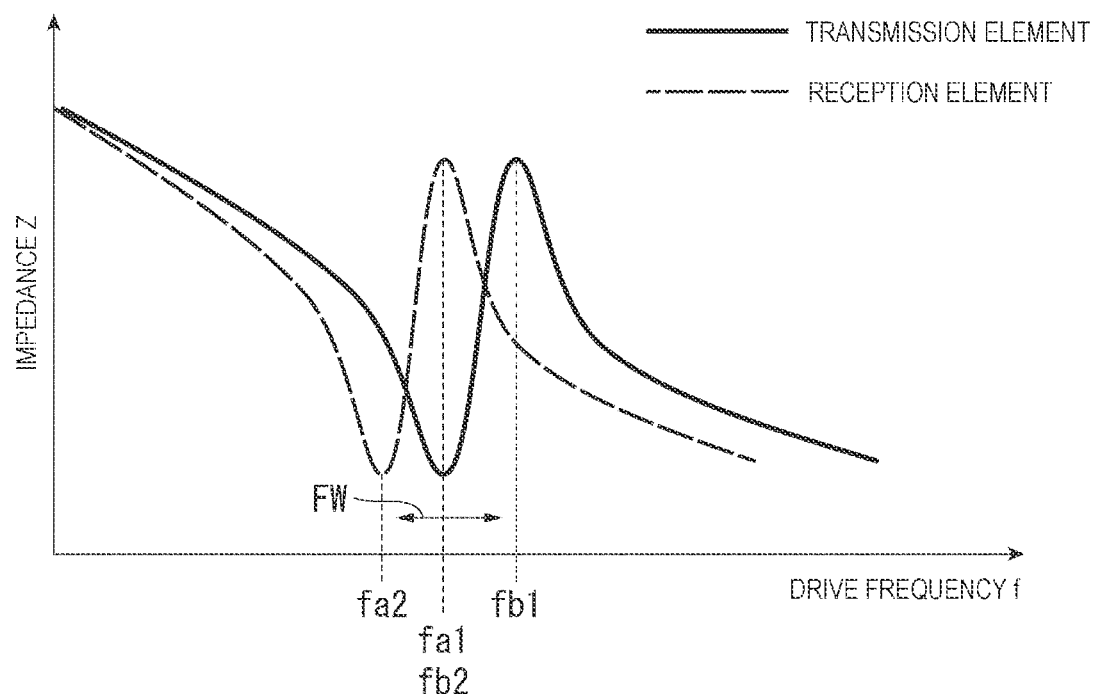
FIG. 6 is a diagram showing impedance curves of a transmitter and a receiver according to the present embodiment.
Figure 7:
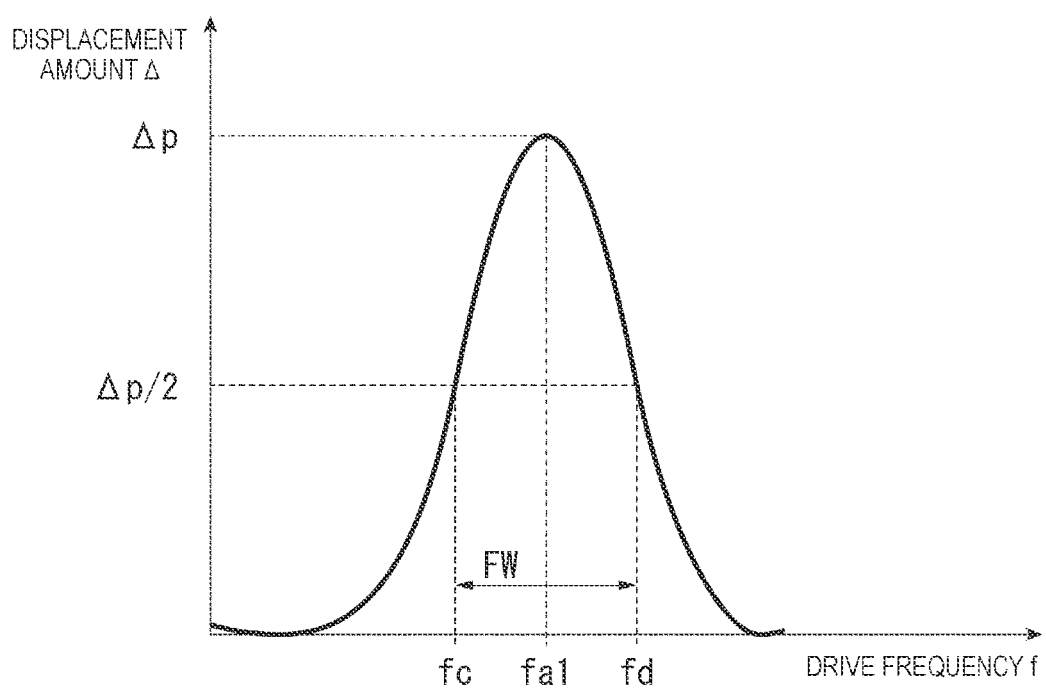
FIG. 7 is a diagram showing a resonance curve of the transmitter of the present embodiment.

FIG. 6 is a graph showing the impedance characteristics of the transmitter 51 and the receiver 52, and FIG. 7 is a graph showing a relationship between the drive frequency f of the transmitter 51 and the displacement amount Δ of the transmitter 51. The displacement amount Δ of the transmitter 51 corresponds to a sound pressure of the ultrasonic wave transmitted from the transmitter 51.

As shown in FIG. 6, the anti-resonance frequency fb2 of the receiver 52 is included in a predetermined frequency band FW including the resonance frequency fa1 of the transmitter 51.

Here, as shown in FIG. 7, the frequency band FW is a full width at half maximum of the resonance frequency fa1 of the transmitter 51, and is defined by the resonance frequency fa1 and a Q value of the transmitter 51.

Specifically, in the graph shown in FIG. 7, when two frequencies at which the displacement amount Δ of the transmitter 51 becomes a half value Δp/2 of a peak value Δp are frequencies fc and fd (fc<fd), the frequency band FW is a range from the frequency fc to the frequency fd. The Q value is a parameter representing a sharpness of the resonance curve shown in FIG. 7.

The anti-resonance frequency fb2 of the receiver 52 is preferably within the frequency band FW and equal to the resonance frequency fa1 of the transmitter 51.

In other words, the difference between the resonance frequency fa1 of the transmitter 51 and the resonance frequency fa2 of the receiver 52 is preferably equal to the difference between the resonance frequency fa2 and the anti-resonance frequency fb2 of the receiver 52.

In such an embodiment, by adjusting the drive frequency f within the frequency band FW, the transmission efficiency of the transmitter 51 and the reception sensitivity of the receiver 52 can be suitably ensured. In particular, when the drive frequency f is adjusted to the resonance frequency fa1 of the transmitter 51 (=the anti-resonance frequency fb2 of the receiver 52), the reception sensitivity of the receiver 52 can be improved while improving the transmission efficiency of the transmitter 51.

Effects of Present Embodiment

The ultrasonic device 10 of the present embodiment includes the transmitter 51 that transmits the ultrasonic wave to the object and the receiver 52 that receives the ultrasonic wave reflected by the object. The resonance frequency fa1 of the transmitter 51 is higher than the resonance frequency fa2 of the receiver 52, and the anti-resonance frequency fb2 of the receiver is included in the frequency band FW corresponding to the resonance frequency fa1 of the transmitter 51.

In the present embodiment, as described above, the mechanical crosstalk from the transmitter 51 to the receiver 52 can be reduced, and the transmission efficiency of the transmitter 51 and the reception sensitivity of the receiver 52 can be suitably ensured.

Further, in the present embodiment, the frequency characteristics of the transmitter 51 and the receiver 52 are adjusted by dimensions and the like of elements constituting each element, and it is not necessary to provide a groove for reducing the crosstalk as in the related art. Therefore, complication and strength reduction of the ultrasonic device 10 can be avoided.

Therefore, in the ultrasonic device 10 of the present embodiment, the ultrasonic wave can be suitably transmitted and received while reducing the mechanical crosstalk with a simple configuration.

In the ultrasonic device 10 of the present embodiment, the frequency band FW corresponding to the resonance frequency fa1 of the transmitter 51 is a full width at half maximum of the resonance frequency fa1 in the relationship between the drive frequency f of the transmitter 51 and the sound pressure of the ultrasonic wave transmitted from the transmitter 51.

In such an embodiment, by adjusting the drive frequency within the frequency band FW, the transmission efficiency of the transmitter 51 and the reception sensitivity of the receiver 52 can be more suitably ensured.

Further, in the ultrasonic device 10 of the present embodiment, the anti-resonance frequency fb2 of the receiver 52 coincides with the resonance frequency fa1 of the transmitter 51, such that the transmission efficiency of the transmitter 51 and the reception sensitivity of the receiver 52 can be optimally ensured.

In the ultrasonic device 10 of the present embodiment, the transmitter 51 and the receiver 52 are bending vibration type transmitters which include the vibrating portions 23a and 23b that close the openings 210a and 210b provided at the substrate 20 and the piezoelectric elements 30a and 30b disposed at the vibrating portions 23a and 23b, respectively, and perform the transmission or the reception of the ultrasonic waves by bending the vibrating portions 23a and 23b.

In the ultrasonic device 10 of the present embodiment, the resonance frequency fa1 of the transmitter 51 and the resonance frequency fa2 of the receiver 52 are adjusted by the opening widths of the corresponding openings 210a and 210b, respectively. Specifically, the width of the opening 210a corresponding to the transmitter 51 is smaller than the width of the opening 210b corresponding to the receiver 52.

According to such a configuration, the ultrasonic device 10 can be suitably manufactured without significantly increasing the number of manufacturing steps.

Modification

The present disclosure is not limited to the embodiment described above, and configurations obtained through modifications, alterations, and appropriate combinations of the embodiment within a scope of being capable of achieving the object of the present disclosure are included in the present disclosure.

First Modification

In the above-described embodiment, the substrate 20 includes the plurality of openings 210a and 210b corresponding to the vibrating portions 23a and 23b, and the vibrating portions 23a and 23b are portions of the vibration plate 22 surrounded by the edges of the opening 210a and 210b of the substrate 20, but the present disclosure is not limited thereto. For example, the vibrating portion 23 may be defined by openings 210a and 210b formed at the substrate 20 so as to have a longitudinal direction in the X direction, and the protruding portions 42 of the protective member 40 formed so as to have a longitudinal direction in the Y direction. That is, the vibrating portions 23a and 23b may be regions of the vibration plate 22 surrounded by the edges of the openings 210a and 210b that are elongated in the X direction and edges of the protruding portions 42 that are elongated in the Y direction.

Further, in the above-described embodiment, the substrate 20 includes the substrate main body 21 and the vibration plate 22, and portions of the vibration plate 22 that close the openings 210a and 210b of the substrate main body 21 serve as the vibrating portions 23a and 23b, but the present disclosure is not limited thereto. For example, etching may be performed on the substrate 20, and portions of the substrate 20 where a thickness is reduced may be used as the vibrating portions 23a and 23b.

Further, the above-described embodiment describes that the dimension in the X direction and the dimension in the Y direction are equal to each other in each of the openings 210a and 210b, but the dimensions may be different from each other.

Second Modification

In the above-described embodiment, the resonance frequencies fa1 and fa2 of the transmitter 51 and the receiver 52 are adjusted by the widths of the openings 210a and 210b corresponding to the transmitter 51 and the receiver 52, respectively. However, a method of adjusting the resonance frequencies fa1 and fa2 of the transmitter 51 and the receiver 52 is not limited thereto.

For example, the resonance frequency fa1 of the transmitter 51 may be adjusted by a thickness of the vibrating portion 23a of the transmitter 51, and the resonance frequency fa2 of the receiver 52 may be adjusted by a thickness of the vibrating portion 23b of the receiver 52. In this case, the thickness of the vibrating portion 23a of the transmitter 51 is formed larger than the thickness of the vibrating portion 23b of the receiver 52.

For example, the resonance frequency fa1 of the transmitter 51 may be adjusted by a bending rigidity of the vibrating portion 23a of the transmitter 51, and the resonance frequency fa2 of the receiver 52 may be adjusted by a bending rigidity of the vibrating portion 23b of the receiver 52. In this case, the bending rigidity of the vibrating portion 23a of the transmitter 51 is formed to be greater than the bending rigidity of the vibrating portion 23b of the receiver 52.

A method of adjusting the bending rigidity includes, for example, a method of etching a region of the vibration plate 22 corresponding to the transmitter 51 or a region corresponding to the receiver 52.

The resonance frequency of each of the transmitter 51 and the receiver 52 may be adjusted by combining the above-described methods.

In such a modification as well, the same effects as those of the above-described embodiment can be implemented.

Third Modification

In the above-described embodiment, each of the transmitter 51 and the receiver 52 is the bending vibration type ultrasonic element 50, but the present disclosure is not limited thereto.

Figure 8:
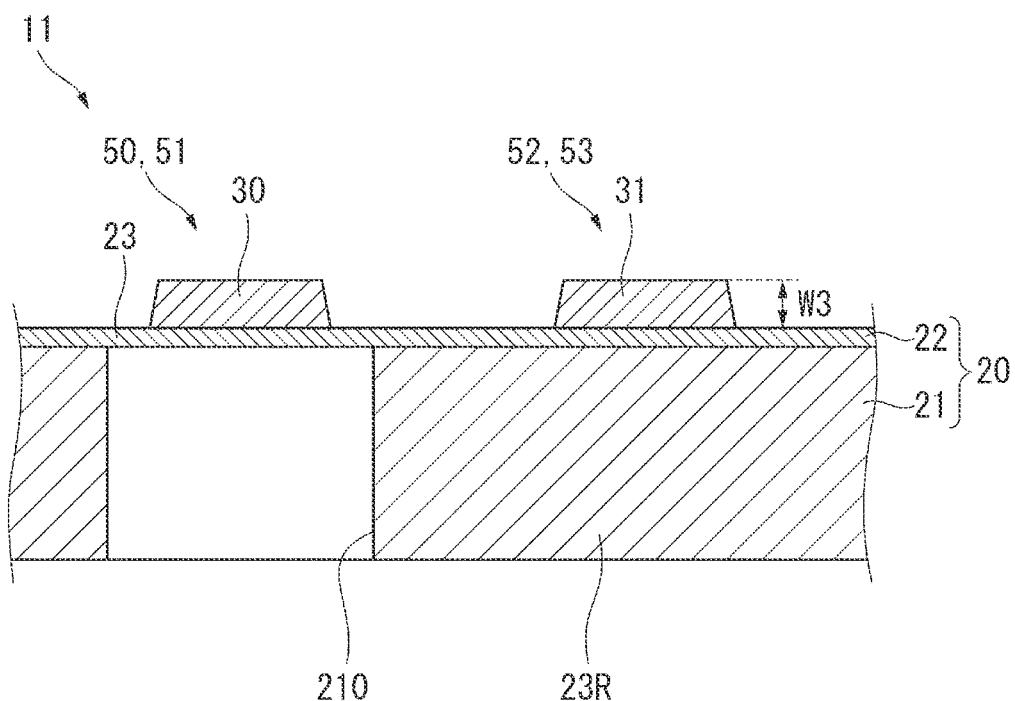
FIG. 8 is a cross-sectional view schematically showing ultrasonic elements according to a modification of the present embodiment.

For example, as shown in FIG. 8, in an ultrasonic device 11 according to the modification, in the transmitter 51 and the receiver 52, one (the transmitter 51 in FIG. 8) may be the bending vibration type ultrasonic element 50 similar to the above-described embodiment, and the other (the receiver 52 in FIG. 8) may be a thickness vibration type ultrasonic element 53.

Further, in another modification, both of the transmitter 51 and the receiver 52 may be the thickness vibration type ultrasonic elements 53 as shown in FIG. 8.

Here, the thickness vibration type ultrasonic element 53 includes a piezoelectric element 31 disposed in a predetermined region 23R of the substrate 20. In the thickness vibration type transmitter 51, when a voltage is applied to the piezoelectric element 31 serving as a transmission piezoelectric element, a piezoelectric body constituting the piezoelectric element 31 expands and contracts in a thickness direction, so that an ultrasonic wave is transmitted. In the thickness vibration type receiver 52, the piezoelectric body constituting the piezoelectric element 31 serving as a reception piezoelectric element expands and contracts in the thickness direction, so that a potential difference is generated in the piezoelectric element 31.

A resonance frequency of the thickness vibration type ultrasonic element 53 can be adjusted by a thickness W3 of the piezoelectric element 31.

In such a modification as well, the same effects as those of the above-described embodiment can be implemented.

Fourth Modification

In the above-described embodiment, the predetermined frequency band FW including the resonance frequency fa1 of the transmitter 51 is a full width at half maximum of the resonance frequency fa1 in a relationship between the drive frequency f of the transmitter 51 and a sound pressure of an ultrasonic wave transmitted from the transmitter 51, but the present disclosure is not limited thereto. For example, a frequency range indicating transmission efficiency necessary for the transmitter 51 to transmit the ultrasonic wave may be obtained by any method, and the frequency range may be set to the predetermined frequency band FW.

Overview of Present Disclosure

The present disclosure will be summarized as follows.

An ultrasonic device according to an aspect of the present disclosure includes a substrate, a transmitter provided at the substrate and configured to transmit an ultrasonic wave to an object, and a receiver provided at a position different from the transmitter at the substrate and configured to receive an ultrasonic wave reflected by the object. A resonance frequency of the transmitter is higher than a resonance frequency of the receiver. An anti-resonance frequency of the receiver is included in a predetermined frequency band including the resonance frequency of the transmitter.

In such an aspect, a mechanical crosstalk from the transmitter to the receiver can be reduced, and transmission efficiency of the transmitter and reception sensitivity of the receiver can be suitably ensured.

Further, the frequency characteristic of each of the transmitter and the receiver is adjusted by dimensions and the like of elements constituting each element, and it is not necessary to provide a groove for reducing a crosstalk as in the related art. Therefore, complication and strength reduction of the ultrasonic device can be avoided.

In the ultrasonic device of the present aspect, the frequency band may be a full width at half maximum of the resonance frequency in a relationship between a drive frequency of the transmitter and a sound pressure of the ultrasonic wave transmitted from the transmitter. In such an aspect, by adjusting the drive frequency within the frequency band, the transmission efficiency of the transmitter and the reception sensitivity of the receiver can be more suitably ensured.

In the ultrasonic device of the present aspect, the anti-resonance frequency of the receiver may be equal to the resonance frequency of the transmitter. Accordingly, the transmission efficiency of the transmitter and the reception sensitivity of the receiver can be optimally ensured.

In the ultrasonic device of the present aspect, the transmitter is a bending vibration type transmitter including a transmission vibrating portion that closes a transmission opening provided at the substrate, and a transmission piezoelectric element disposed at the transmission vibrating portion, in which when a voltage is applied to the transmission piezoelectric element, a piezoelectric body constituting the transmission piezoelectric element expands and contracts in a thickness direction so that the ultrasonic wave is transmitted. The receiver is a bending vibration type receiver including a reception vibrating portion that closes a reception opening provided at the substrate, and a reception piezoelectric element disposed at the reception vibrating portion, in which the bending vibration type receiver generates a potential difference in the reception piezoelectric element upon vibration of the reception vibrating portion.

Further, in the ultrasonic device of the present aspect, a width of the transmission opening may be smaller than a width of the reception opening.

Accordingly, the ultrasonic device of the present aspect can be suitably manufactured without significantly increasing the number of manufacturing steps.

In the ultrasonic device of the present aspect, a bending rigidity of the transmission vibrating portion may be greater than a bending rigidity of the reception vibrating portion.

According to such an aspect as well, the ultrasonic device of the present aspect can be suitably manufactured.

In the ultrasonic device of the present aspect, a thickness of the transmission piezoelectric element may be larger than a thickness of the reception piezoelectric element.

According to such an aspect as well, the ultrasonic device of the present aspect can be suitably manufactured.

In the ultrasonic device of the present aspect, the transmitter may be a thickness vibration type transmitter including a piezoelectric element disposed at the substrate, in which when a voltage is applied to the piezoelectric element, a piezoelectric body constituting the piezoelectric element expands and contracts in a thickness direction so that the ultrasonic wave is transmitted. The receiver may be a thickness vibration type receiver including a piezoelectric element disposed at the substrate, in which the thickness vibration type receiver generates a potential difference in the reception piezoelectric element upon expansion and contraction in a thickness direction of a piezoelectric body constituting the reception piezoelectric element.

Further, in the ultrasonic device of the present aspect, the transmitter may be a bending vibration type transmitter including a transmission vibrating portion that closes a transmission opening provided at the substrate, and a transmission piezoelectric element disposed at the transmission vibrating portion, in which when a voltage is applied to the transmission piezoelectric element, the transmission vibrating portion is bent so that the ultrasonic wave is transmitted. The receiver may be a thickness vibration type receiver including a piezoelectric element disposed at the substrate, in which the thickness vibration type receiver generates a potential difference in the piezoelectric element upon expansion and contraction in a thickness direction of a piezoelectric body constituting the piezoelectric element.

Similarly, in the ultrasonic device of the present aspect, the transmitter may be a thickness vibration type transmitter including a piezoelectric element disposed at the substrate, in which when a voltage is applied to the piezoelectric element, a piezoelectric body constituting the piezoelectric element expands and contracts in a thickness direction so that the ultrasonic wave is transmitted. The receiver may be a bending vibration type receiver including a reception vibrating portion that closes a reception opening provided at the substrate, and a reception piezoelectric element disposed at the reception vibrating portion, in which the bending vibration type receiver generates a potential difference in the reception piezoelectric element upon vibration of the reception vibrating portion.

That is, the ultrasonic device of the present aspect can be applied to an ultrasonic device in which various types of ultrasonic elements are combined.

What is claimed is:

1. An ultrasonic device, comprising:
    a substrate;
    a transmitter at the substrate, wherein the transmitter is configured to transmit an ultrasonic wave to an object; and
    a receiver at a position different from a position of the transmitter at the substrate, wherein
        the receiver is configured to receive an ultrasonic wave reflected by the object,
        the substrate has a transmission opening corresponding to the position of the transmitter and a reception opening corresponding to the position of the receiver,
        a width of each of the transmission opening and the reception opening is set such that a resonance frequency of the transmitter is higher than a resonance frequency of the receiver, and an anti-resonance frequency of the receiver is in a predetermined frequency band including the resonance frequency of the transmitter, and
        the resonance frequency of the receiver is lower than a lower limit of the predetermined frequency band including the resonance frequency of the transmitter.

2. The ultrasonic device according to claim 1, wherein the predetermined frequency band is a full width at half maximum of the resonance frequency of the transmitter in a relationship between a drive frequency of the transmitter and a sound pressure of the ultrasonic wave transmitted from the transmitter.

3. The ultrasonic device according to claim 1, wherein the anti-resonance frequency of the receiver is equal to the resonance frequency of the transmitter.

4. The ultrasonic device according to claim 1, wherein
the transmitter is a bending vibration type transmitter including a transmission vibrating portion that closes the transmission opening at the substrate, and a transmission piezoelectric element at the transmission vibrating portion,
in a case where a voltage is applied to the transmission piezoelectric element, the transmission vibrating portion is bent so that the ultrasonic wave is transmitted,
the receiver is a bending vibration type receiver including a reception vibrating portion that closes the reception opening at the substrate, and a reception piezoelectric element at the reception vibrating portion, and
the bending vibration type receiver is configured to generate a potential difference in the reception piezoelectric element upon vibration of the reception vibrating portion.

5. The ultrasonic device according to claim 4, wherein the width of the transmission opening is smaller than the width of the reception opening.

6. The ultrasonic device according to claim 4, wherein a bending rigidity of the transmission vibrating portion is greater than a bending rigidity of the reception vibrating portion.

7. The ultrasonic device according to claim 4, wherein a thickness of the transmission vibrating portion is larger than a thickness of the reception vibrating portion.

8. The ultrasonic device according to claim 1, wherein
the transmitter is a thickness vibration type transmitter including a transmission piezoelectric element at the substrate,
in a case where a voltage is applied to the transmission piezoelectric element, a piezoelectric body constituting the transmission piezoelectric element is configured to expand and contract in a thickness direction so that the ultrasonic wave is transmitted,
the receiver is a thickness vibration type receiver including a reception piezoelectric element at the substrate, and
the thickness vibration type receiver is configured to generate a potential difference in the reception piezoelectric element upon expansion and contraction in the thickness direction of a piezoelectric body constituting the reception piezoelectric element.

9. The ultrasonic device according to claim 1, wherein
the transmitter is a bending vibration type transmitter including a transmission vibrating portion that closes the transmission opening at the substrate, and a transmission piezoelectric element at the transmission vibrating portion,
in a case where a voltage is applied to the transmission piezoelectric element, the transmission vibrating portion is bent so that the ultrasonic wave is transmitted,
the receiver is a thickness vibration type receiver including a reception piezoelectric element at the substrate, and
the thickness vibration type receiver is configured to generate a potential difference in the reception piezoelectric element upon expansion and contraction in a thickness direction of a piezoelectric body constituting the reception piezoelectric element.

10. The ultrasonic device according to claim 1, wherein
the transmitter is a thickness vibration type transmitter including a transmission piezoelectric element at the substrate,
in a case where a voltage is applied to the transmission piezoelectric element, a piezoelectric body constituting the transmission piezoelectric element is configured to expand and contract in a thickness direction so that the ultrasonic wave is transmitted,
the receiver is a bending vibration type receiver including a reception vibrating portion that closes the reception opening at the substrate, and a reception piezoelectric element at the reception vibrating portion, and
the bending vibration type receiver is configured to generate a potential difference in the reception piezoelectric element upon vibration of the reception vibrating portion.

* * * * *